United States Patent
Gleasman et al.

(10) Patent No.: US 7,540,821 B2
(45) Date of Patent: Jun. 2, 2009

(54) FULL TRACTION DIFFERENTIAL WITH HYBRID GEARING

(75) Inventors: Keith E. Gleasman, Fairport, NY (US); James Y. Gleasman, Rochester, NY (US); Paul W. Suwijn, Pittsford, NY (US)

(73) Assignee: Torvec, Inc, Rochester, NY (US)

( * ) Notice: Subject to any disclaimer, the term of this patent is extended or adjusted under 35 U.S.C. 154(b) by 407 days.

(21) Appl. No.: 11/553,603

(22) Filed: Oct. 27, 2006

(65) Prior Publication Data

US 2008/0103008 A1    May 1, 2008

(51) Int. Cl.
 F16H 48/06    (2006.01)
 F16H 57/08    (2006.01)
 B26D 1/12    (2006.01)
(52) U.S. Cl. .......................... 475/227; 475/344; 407/26
(58) Field of Classification Search ................. 475/220, 475/226, 227, 228, 229, 248, 251, 252, 344; 409/11; 407/23–26
See application file for complete search history.

(56) References Cited

U.S. PATENT DOCUMENTS

| | | | |
|---|---|---|---|
| 2,022,141 A | 11/1935 | Morgan | |
| 2,859,641 A | 11/1958 | Gleasman | |
| 3,735,647 A | 5/1973 | Gleasman | |
| 3,849,862 A | 11/1974 | Benjamin | |
| 3,875,824 A | 4/1975 | Benjamin | |
| 3,884,096 A | 5/1975 | Gleasman | |
| 4,191,071 A | 3/1980 | Gleasman et al. | |
| 4,514,119 A | 4/1985 | Izumo | |
| 4,724,721 A | 2/1988 | Gleasman et al. | |
| 4,776,235 A | 10/1988 | Gleasman et al. | |
| 4,878,400 A | 11/1989 | Kimura et al. | |
| 4,907,672 A | 3/1990 | Muzzarelli | |
| 4,926,712 A | 5/1990 | Stritzel | |
| 5,030,185 A | 7/1991 | Kawamura | |
| 5,067,934 A | 11/1991 | Sato | |
| 5,112,284 A | 5/1992 | Dye | |
| 5,175,962 A | 1/1993 | Pedersen | |
| 5,195,934 A | 3/1993 | Ichiki et al. | |
| 5,232,415 A | 8/1993 | Brewer et al. | |
| 5,338,134 A * | 8/1994 | Peng ........................... | 407/26 |
| 5,338,267 A | 8/1994 | Takahashi et al. | |
| 5,626,443 A * | 5/1997 | Clark .......................... | 407/26 |

(Continued)

FOREIGN PATENT DOCUMENTS

DE    3927072 A1    3/1990

(Continued)

Primary Examiner—Roger Pang
(74) Attorney, Agent, or Firm—Brown & Michaels, PC (57) ABSTRACT

The compact, all-gear full-traction differential includes meshing pairs of side-gear worms and worm-wheel balance gears having a "hybrid" design. Preferably, the teeth of each side-gear worm have an involute profile but are cut with only plunge feed, while the teeth of the worm-wheel portions of the balance gears are helicoid worms having tip and root modifications made by a concave-shaped cutter. The side-gear worm teeth have a helix angle equal to or greater than 45° and significantly chamfered ends, and the gears are designed to provide a gear ratio between 1.5:1 and 2.5:1. The numbers of teeth in the spur-gear portion and worm-wheel portion of each balance gear and in each side-gear worm are all divisible by 2 or by 3, preferably by both 2 and 3.

10 Claims, 4 Drawing Sheets

U.S. PATENT DOCUMENTS

| | | |
|---|---|---|
| 6,148,683 A | 11/2000 | Fleytman |
| 6,318,204 B1 | 11/2001 | Kranz et al. |
| 6,390,893 B1 | 5/2002 | Stadtfeld et al. |
| 6,582,338 B1 | 6/2003 | Fleytman |
| 6,783,476 B2 | 8/2004 | Gleasman et al. |
| 2005/0063794 A1* | 3/2005 | Fleytman ............ 409/48 |

FOREIGN PATENT DOCUMENTS

JP 02283942 A 11/1990

* cited by examiner

Fig. 1A

PRIOR ART

Fig. 1B

PRIOR ART

FULL TRACTION DIFFERENTIAL WITH HYBRID GEARING

BACKGROUND OF THE INVENTION

1. Field of the Invention

This invention relates to all-gear differentials of the type commonly referred to as "limited-slip" designed primarily for automotive use and, more particularly, to such differentials designed for use in vehicles where efficiency, space, cost, and weight are critical.

2. Description of Related Art

While there are many types of limited-slip differentials, some of the most commercially successful have been the all-gear differentials based upon the designs of Vernon E. Gleasman, and the most efficient of these have been those based upon his crossed-axis design that has been identified commercially as the Torsen®-Type 1 differential. A recent improvement of such known limited-slip differentials using crossed-axis planetary gearing was disclosed in U.S. Pat. No. 6,783,476 ("Compact Full-Traction Differential", assigned to the same assignee as the present invention and identified by the trademark "IsoTorque"), incorporated by reference herein. The improved differential disclosed in the just-identified patent is smaller in both size and weight than earlier designs of other prior art crossed-axis differentials, and it is less costly to manufacture, while meeting similar load-carrying specifications.

Figure 1A:
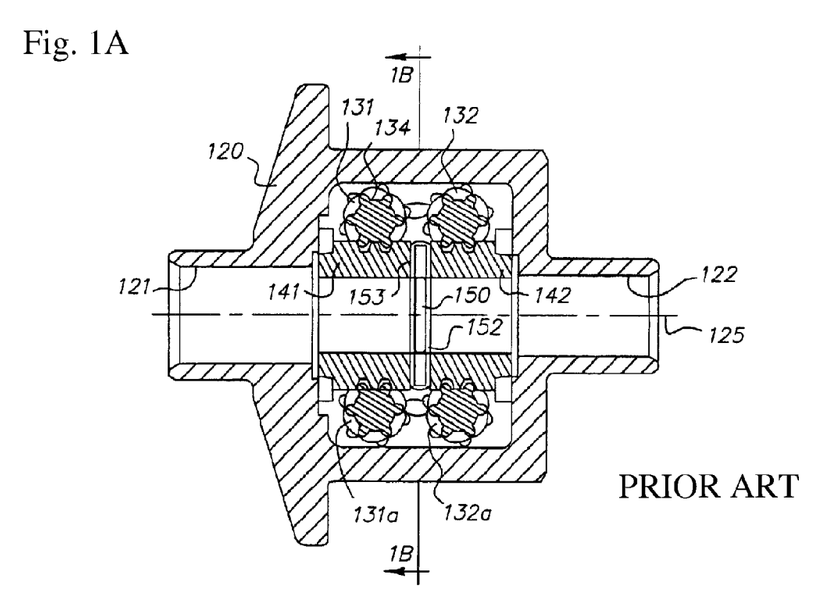
FIG. 1A is a schematic and partially cross sectional view of a prior art compact full-traction differential of the type being improved herein.
Figure 1B:
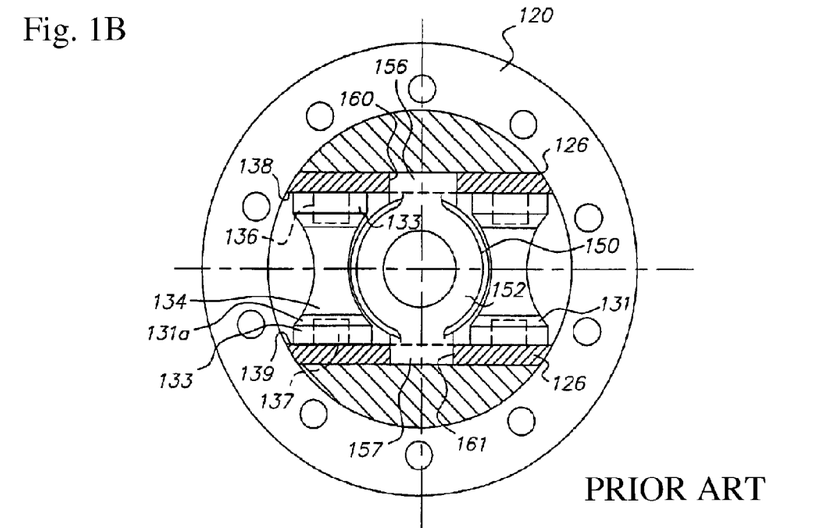
FIG. 1B is a schematic and partially cross sectional view of the differential of FIG. 1B, the view in FIG. 1B being taken in the plane 1B-1B of FIG. 1A.

All traditional Gleasman crossed-axis differentials include pairs of unusual balance (combination) gears, e.g., 131, 132 and 131a, 132a in FIGS. 1A and 1B, that (a) mesh with each other through spur-gear portions 133 formed at each end and (b) mesh with the side-gear worms 141, 142 through helical teeth formed in hourglass shaped worm-wheel portions 134 positioned between the two spur teeth ends. A key feature of Gleasman all gear cross-axis differentials, including the older designs (e.g., Torsen®-Type 1), is the relationship of each side gear, intended to act as a "worm", with "worm-wheel" teeth on the central portions of each of the differential's balance gears.

A "worm" is traditionally a cylindrical gear with teeth in the form of a screw thread that mates with a larger gear generally identified as a "wormgear" or as a "worm-wheel", and that latter term is used herein. However, as used in Gleasman-type differentials, the side-gear worm is the larger of the two gears. In traditional worm/worm-wheel gearing, there is a mechanical advantage as energy is transferred from the worm to the worm-wheel and a concomitant mechanical disadvantage when energy is transferred from the worm-wheel to the worm. This same mechanical advantage/disadvantage relationship is also true in regard to the transfer of energy between the side-gear worm and the balance gear worm-wheel of the Gleasman-type differentials as just discussed above and as disclosed herein.

In conventional differentials, when one drive wheel of a vehicle loses traction, most of the engine torque is immediately delivered to the slipping wheel. With Gleasman-type differentials, the mechanical disadvantage created by the worm-wheel/worm connection from the engine to the wheel constrains the excess slipping of the low-traction wheel. This same connection, when operating in the worm/worm-wheel direction, enhances the response of the differential to the changes in drive wheel speeds when the vehicle is turning corners and the outside wheels are traveling over a longer distance than the inside wheels within the same time period.

The geometric requirements for a smooth rolling gear-mesh normally restrict the tooth ratios (i.e., ratio of the number of teeth in one member of a gear pair to the number of teeth in the other member) of true worm/worm-wheel gear sets to a ratio of at least 3.5:1, and much higher tooth ratios are normally designed for this class of gear set. This ratio limitation is true for straight flank worms of the screw thread type as well as for involute helicoid worms of the generated type. Numerous geometric interferences will normally result from any attempt to design worm/worm-wheel gear sets with a ratio lower than 3.5:1.

However, in view of the relatively small package size and relatively high strength requirements of the gear members in a crossed-axis differential, the optimal worm/worm-wheel ratio would ideally fall into the gear ratio range of 1.5:1 and 2.5:1, but none of the prior art gears are able to meet these ratios. Therefore, in actual practice, the side gear "worm" teeth and the balance gear "worm-wheel" teeth of prior art crossed-axis differentials have not been executed as actual worm/worm wheel designs, but rather as crossed helical gear sets, with both elements having simple helical gear geometry. The serious limitation of this approach is that crossed helical gear sets have instantaneous "point" contact, rather than broad area contact patterns, and thus are susceptible to loading limitations and accelerated wear.

The crossed helical gear geometries in the existing art are also quite limited in their frictional component, as they operate primarily in rolling contact over their very limited contact area. Because the effectiveness of torque transfer to the wheel with greater traction depends upon this frictional component, it would be desirable to increase friction in this critical side gear/balance gear mesh. Such frictional increases would have little effect upon overall driveline efficiency, since the low relative rotational speed of this set represents only differentiation in wheel speed, normally falling in the 0-20 rpm range in practice.

A partial change from the traditional helical shape is disclosed in above-identified U.S. Pat. No. 6,783,476. That patent discloses helical worm/worm-wheel teeth having a "supra-enveloping" contact pattern. Namely, the worm-wheel portions of the balance gears still have the traditional helical-gear shape (an involute helicoid form being cut with a conventional straight-sided hob), while the meshing worms (i.e., the side gears) have mating "inverse-involute" teeth that are cut with an involute hob. That patent, as well as other prior art, also suggests the use of "closed-end" side gears.

Conventional crossed-axis helical gears are cut by a hob with straight-sided teeth, the hob being rotated with a combination of plunge and axial feed. Conventional worm-wheels are also cut by a hob with straight-sided teeth, but the hob is rotated with only a plunge-feed and no axial feed.

As indicated above, all-gear crossed-axis differentials include unusual balance gears that (a) mesh with each other through spur teeth formed at each end and (b) mesh with the side gears through helical teeth formed between the two spur teeth ends. During assembly, these unusual teeth must be positioned in proper mesh and orientation to assure equal load sharing. This orientation process is referred to as "timing".

In all prior art designs, the gears have a mixture of odd and even numbers of teeth. A typical prior art example is as follows: the number of spur teeth at each end of the balancing gears is 18, the number of teeth in the worm-wheel of each balancing gear is 7, and the number of teeth in each side gear is 13. These unusual prior art tooth numbers are not created haphazardly but rather are particularly chosen in part to combat special gear set wear problems associated with the point or line contact characteristics of crossed helical gear sets. Nonetheless, these differing gear numbers create complicated timing problems. For instance, all prior art designs require that timing marks be placed on each combination gear and that careful attention be made during assembly to an instruction chart. The order of gear assembly is indicated as well as the individually different distances that the mark must be rotated for each gear as it is assembled, etc. The prior art instructions, for example, ". . . [T]he internal loads will not be evenly balanced among the gears, and some will be severely overloaded. This will lead to eventual failure, often catastrophic", warn that incorrect timing can have dangerous results.

SUMMARY OF THE INVENTION

The compact, all-gear full-traction differential includes meshing pairs of side-gear worms and worm-wheel balance gears having a "hybrid" design that results in an improved tooth contact pattern between the side gears and the central portion of the balance gears and more closely approximates true worm/worm-wheel characteristics, inherently increasing the effectiveness of torque transfer to the wheel with greater traction, increasing shock resistance, and permitting a timing relationship between all the gears of the differential that remarkably simplifies assembly. Preferably, the teeth of each side-gear worm have an involute profile but are cut with only plunge feed, while the teeth of the worm-wheel portions of the balance gears are helicoid worms having tip and root modifications made by a concave-shaped cutter. The side-gear worm teeth have a helix angle equal to or greater than 45° and significantly chamfered ends, and the gears are designed to provide a gear ratio between 1.5:1 and 2.5:1. The numbers of teeth in the (a) spur-gear portion and (b) worm-wheel portion of each balance gear, and (c) in each side-gear worm are all divisible by 2 or by 3, preferably by both 2 and 3. Further, any improperly positioned balance gear does not align properly with its respective mounting hole in the housing and, by merely rotating such a misaligned balance gear by one tooth in either direction, correct alignment and gear timing is achieved.

DETAILED DESCRIPTION OF THE INVENTION

Preferably, the teeth of each side-gear worm have an involute profile but are cut with only plunge feed, while the teeth of the worm-wheel portions of the balance gears are helicoid worms having tip and root modifications made by a concave-shaped cutter. The side-gear worm teeth have a helix angle equal to or greater than 45° and significantly chamfered ends, and the gears are designed to provide a gear ratio between 1.5:1 and 2.5:1. The numbers of teeth in the (a) spur-gear portion and (b) worm-wheel portion of each balance gear, and (c) in each side-gear worm are all divisible by 2 or by 3, preferably by both 2 and 3. Further, any improperly positioned balance gear does not align properly with its respective mounting hole in the housing and, by merely rotating such a misaligned balance gear by one tooth in either direction, correct alignment and gear timing is achieved.

The new tooth design disclosed herein is best described as a "hybrid" between standard worm/worm-wheel gearing and helical gearing that produces a "box-like" broad tooth contact pattern (i.e., different than either point or line contact). The new side-gear worm is no longer cut like a conventional cross-axis helical gear. Instead, it is cut in the same manner as a conventional worm-wheel, namely, with only plunge feed and no axial feed. Further, the side-gear worm is provided with a radical helix angle greater than 45° so that it functions effectively as a worm in its relationship with the balance-gear worm-wheel. Compared to the prior art's crossed helical gear sets, the hybrid worm/worm-wheel set described in the present invention has the advantages of a significantly broader and longer tooth contact pattern that reduces the unit loading on specific portions of the meshing teeth. Since the side-gear worm has a true hourglass (plunge generated) geometry, the tooth beam sections at both ends of these new side-gear teeth are also thicker and more robust than in the prior crossed helical side gear designs.

Worm/worm-wheel sets, by their nature, have a significantly higher sliding component in their meshing action than helical sets, and this corresponds to a higher frictional component in the mesh. A true worm/worm-wheel set provides a greater mechanical disadvantage when the balance gear worm-wheel tries to back-drive the side-gear worm. Thus with a true worm/worm-wheel set, the effectiveness of the crossed axis differential in transferring torque to the wheel with greater traction would be inherently greater than the prior art that is typically based upon crossed helical gear meshes.

In contrast to the prior art, the worm-wheel central portion of each balance gear of the present invention is cut in the same manner as a conventional helical gear, i.e., with axial feed and rotation. However, the conventional straight-sided hob tool traditionally used to cut helical gear teeth is modified to a slightly "concave" form so that the resulting profile of each worm-wheel tooth becomes an intentional modification of the conventional involute shape to avoid tip and root interferences, so that it can function effectively as a worm-wheel in the unusually low gear ratio of the worm/worm-wheel set.

As mentioned above, conventional worm/worm-wheel design requires that tooth ratios must be at least 3.5:1, while the designs in prior art Gleasman-type differentials have been less than 1:5:1. In a further major deviation from those known designs, the side-gear worm and balance-gear worm-wheel members of each hybrid inventive pair have tooth ratios only between 1.5:1 to 2.5:1.

This new hybrid worm/worm-wheel design results in significant improvements in load carrying properties and torque-transfer effectiveness in both two-gear set and three-gear set differentials. The broad and relatively long tooth contact pattern provides smooth operation with superior shock-resisting characteristics.

The new hybrid worm/worm-wheel design of the present invention provides a higher sliding component in mesh, averaged over a larger contact area, than prior art crossed helical sets which primarily have rolling contact over a very limited area. Thus, the hybrid gear set in the present invention fundamentally increases the effectiveness of torque transfer to the wheel with greater traction. For any given helix angle combination between balance and side gears, back-driving of the side gear by the balance gear becomes more difficult in proportion to increases in this frictional component. This increase in gear mesh friction has very little effect, however, upon driveline efficiency due to the very low typical rotational speeds of the side gear/balance gear set, equal only to the differential rotational speed of the driven wheels. Likewise, there is very little increase in gear set wear, not only because of the low speed operation but also because wear is averaged out over a much larger contact area between these members.

Further, the ratios between gears in the differential as a whole have been rationalized to provide very significant assembly advantages. The odd ratios in prior art designs were chosen in part to combat special gear set wear problems associated with the point or line contact characteristics of crossed helical gear sets. The invention's simplification of related gear ratios overcomes the above-mentioned "timing" problems that have plagued prior art differentials in relation to correctly orienting the individual gears during assembly. The invention's interrelated gears are simply and quickly assembled to mesh properly and share the load evenly under all conditions.

In the preferred balance gears disclosed herein, the number of teeth in each set of spur teeth at each end is exactly twice the number of teeth in the central portion of the balance gear. Therefore, without requiring any timing marks on the gears, an incorrect orientation between the side gear and the balance gear will cause the balance gear to become visibly mismatched with the mounting bore for the balance gear in the housing, and rotating the spur teeth of the balance gear by one tooth in either direction results in correct assembly in every case.

In a preferred embodiment, the side gears have the same number of teeth as the spur-gear portions of the balancing gears (e.g., spur=12; worm-wheel=6; and side-gear worm=12). Since all ratios are divisible by both 2 and 3, the correction of assembly by the rotation of a spur by one tooth, as just explained above, works as described with differentials having either two or three sets of balancing gears. This remarkable simplification in timing may be appreciated by comparison with the above-mentioned prior art gear-tooth numbers (e.g., spur=18; worm-wheel=7; and side-gear worm=13).

Finally, using even numbers of teeth in all of the gears makes it possible to assemble any balance gear in any order into either two- or three-set differentials.

The invention herein improves on the prior art compact full-traction differential disclosed in U.S. Pat. No. 6,783,476 and has a similar basic format of that prior art differential. Therefore, reference is first made to FIGS. 1A and 1B that show two views of a complete prior art worm/worm-wheel gear complex of one embodiment of a prior art differential using only two sets of balance gears.

A housing 120 is preferably made of formed or cast metal and has only three openings. Namely, a first set of appropriate openings 121, 122 is aligned along a first axis 125 for receiving the respective inner ends of output axles (not shown); and only a single further opening 126, which is rectangular in shape and extends directly through housing 120, is centered perpendicular to axis 125.

Two pairs of combination gears 131, 132 and 131a, 132a each have respective spur-gear portions 133 separated by an hourglass-shaped worm-wheel portion 134. The respective spur-gear portions 133 of each pair are in mesh with each other, and all of these combination gears are rotatably supported on sets of paired hubs 136, 137 that are formed integrally with an opposing pair of mounting plates 138, 139. The respective worm-wheel portions 134 of combination gear pair 131, 132 are in mesh with respective ones of a pair of side-gear worms 141, 142, while the respective worm-wheel portions 134 of combination gear pair 131a, 132a are similarly in mesh with, respectively, the same pair of side-gear worms 141, 142.

Positioned intermediate the inner ends of side-gear worms 141, 142 is a thrust plate 150 that includes respective bearing surfaces 152, 153, mounting tabs 156, 157, and a weight-saving lubrication opening. Mounting tabs 156, 157 are designed to mate with slots 160, 161 formed centrally in identical mounting plates 138, 139. Slots 160, 161 not only position thrust plate 150 intermediate the inner ends of side-gear worms 141, 142 but also prevent lateral movement of thrust plate 150. Therefore, referring specifically to FIG. 1A, when driving torque applied to side-gear worms 141, 142 results in thrust to the left, worm 142 moves against fixed bearing surface 152 of thrust plate 150, while worm 141 moves away from fixed bearing surface 153 of thrust plate 150 and against housing 120 (or against appropriate washers positioned conventionally between worm 141 and housing 120). The resulting friction against the rotation of worm 141 is unaffected by the thrust forces acting on worm 142. Similarly, when driving torque applied to side-gear worms 141, 142 results in thrust to the right, worm 141 moves against fixed bearing surface 153 of thrust plate 150, while worm, 142 moves away from fixed bearing surface 152 of thrust plate 150 and against housing 120 (or, again, against appropriate washers positioned conventionally between worm 142 and housing 120). Similarly, the resulting friction against the rotation of worm 142 is unaffected by the thrust forces acting on worm 141. Thus, regardless of the direction of the driving torque, the friction acting against the rotation of each side-gear worm is not affected by the thrust forces acting on the other side-gear worm. Since the torque bias of the differential is affected by frictional forces, this prevention of additive thrust forces helps to minimize torque imbalance, i.e., differences in torque during different directions of vehicle turning.

Basic Structure

Figure 2:
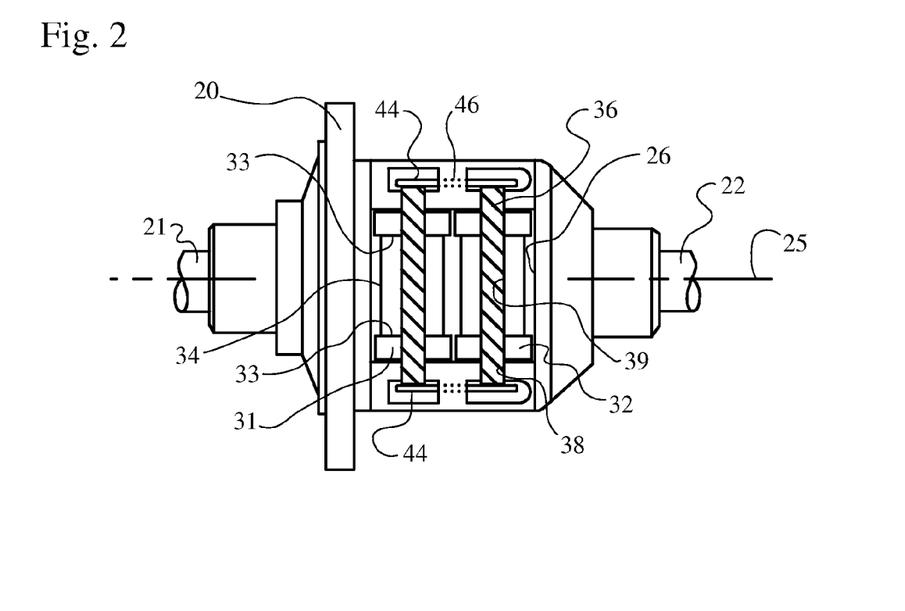
FIG. 2 is a schematic and partially cross sectional view similar to that shown in FIG. 1A, but rotated 90°, showing a two-set differential according to the invention with some parts and some cross-hatching removed for clarity.

FIG. 2 shows a compact full-traction differential according to the present invention. However, the view has been rotated about axis 25 by 90°. The housing 20 is similarly fashioned, preferably of formed or cast metal, and has only three openings. Namely, a first set of appropriate openings is aligned along axis 25 for receiving the respective inner ends of output axles 21 and 22. Only a single further opening 26, which is rectangular in shape and extends directly through housing 20, is centered perpendicular to axis 25.

Two pairs of balance gears 31, 32 (only one pair is shown in this view) each have respective spur-gear portions 33 separated by a worm-wheel portion 34. It will be noted that, with the new hybrid gearing design disclosed herein, this central portion of each balance gear does not have the hourglass shape of the prior art. While the respective spur-gear portions 33 of each pair are in mesh with each other, the mounting plates of the prior art have been replaced by through holes 38 formed in housing 20, and each balance gear is rotatably supported on a respective journal pin 36 that fits through an appropriate respective mounting through-hole 39 centered axially through each balance gear. Following initial assembly, respective stop pins 44 are press fitted into respective stop pin holes 46 also formed in housing 20 perpendicular to respective through holes 38 to maintain the position of journal pins 36 of each respective pair of balance gears 31, 32.

Figure 3:
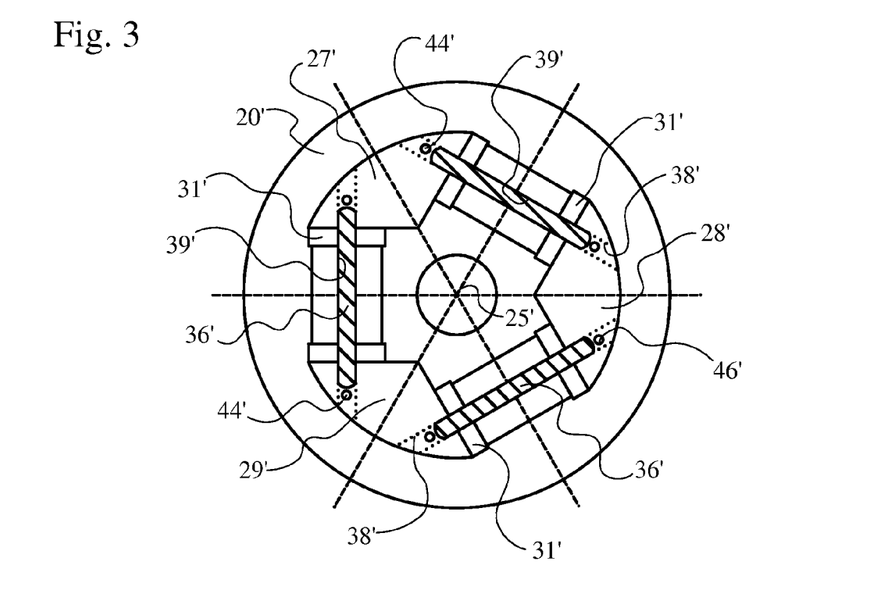
FIG. 3 is a schematic and partially cross sectional view similar to that shown in FIG. 1B, showing a three-set differential according to the invention, again with some parts and some cross-hatching removed for clarity.

FIG. 3 shows a three-gear set embodiment of another differential according to the invention, this schematic and cross sectional view being taken perpendicular to axis 25'. As persons skilled in the art will understand, such three-gear set differentials are used to carry the exceptional torque requirements of high performance vehicles. This embodiment includes three pairs of balance gears, but only one balance gear 31' of each set can be seen in this view. A housing 20' comprises three opposed mounting sections 27', 28', 29', each mounting section being shaped as a segment with two interior surfaces forming mounting surfaces meeting at 240° and each including a mounting through hole 38'. For providing rotatable support for each balance gear 31', a plurality of journal pins 36' are matingly received respectively in the journal holes 39' formed through each balance gear 31', and each respective journal pin 36' is, in turn, received in a respective set of aligned through holes 38' formed in the opposed mounting surfaces of a respective pair of mounting sections 27', 28', 29' of housing 20'.

Similar to the design of the differential shown in FIG. 2, a plurality of stop pins 44' can preferably be used to prevent accidental removal of any respective journal pin 36'. Respective stop pins 44' are press-fitted into respective appropriately sized stop pin holes 46' formed in respective mounting sections 27', 28', 29' perpendicular to each respective through hole 38'.

Hybrid Gearing

A primary feature of the invention is the design of the gearing shared by the side-gear worms and the worm-wheel portions of each of the balance gears. As indicated above, prior art full-traction crossed-axis gear differentials have used the traditional involute helicoid tooth designs of cylindrical helical gears for the teeth of both the side-gear worms and the teeth of the worm-wheel portions of the balance gears. The invention modifies the design of both of these gears to provide hybrid gearing that more closely approximates the characteristics of a traditional worm/worm-wheel combination while providing a "box-like" broad tooth contact pattern (i.e., different than either point or line contact of prior art designs). These hybrid teeth characteristics are preferably applied to the respective gears of each pair in the manner explained below.

Figure 4:
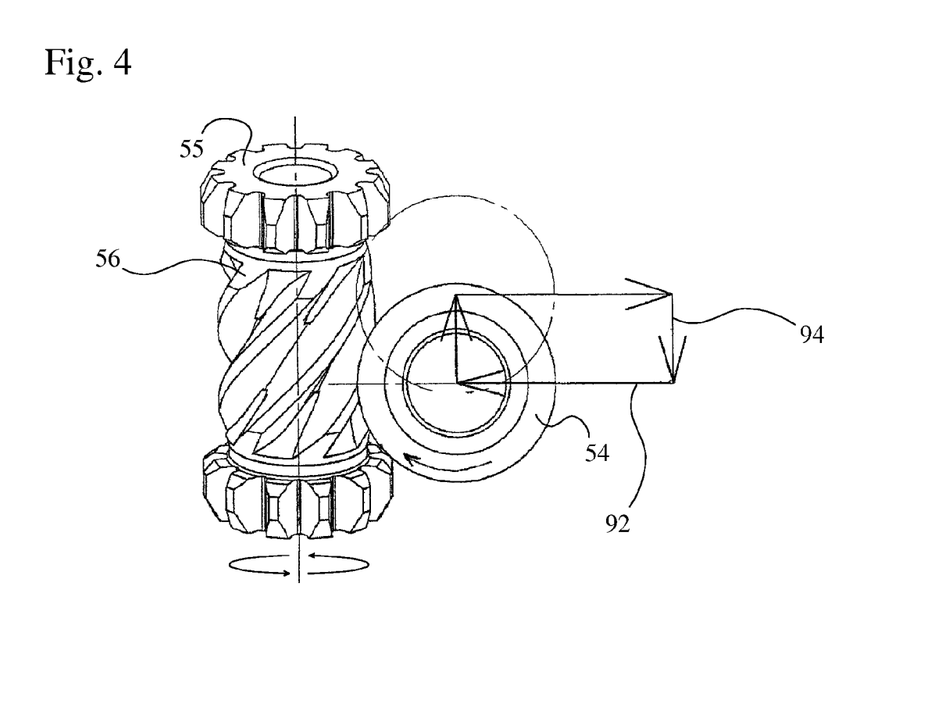
FIG. 4 is a partially schematic representation showing the teeth on the worm-wheel portion of a balance gear according to the invention being cut by a modified hob tool.

With regard to the modification of the teeth of the worm-wheel portion of the balance gears, FIG. 4 shows the relative motion of a hob 54 during the cutting of the teeth of the worm-wheel portion 56 of a balance gear 55. The initial movement of hob 54 is a plunge feed (PF) 92 to depth followed by an axial feed (AF) 94, relative to balance gear 55, while both the hob and gear rotate. Those skilled in the art will appreciate that this is the same process used to cut a conventional helical gear. However, with the traditional process, the hob cutting tool is straight sided, and the resulting helicoidal teeth have an involute profile.

Figure 5:
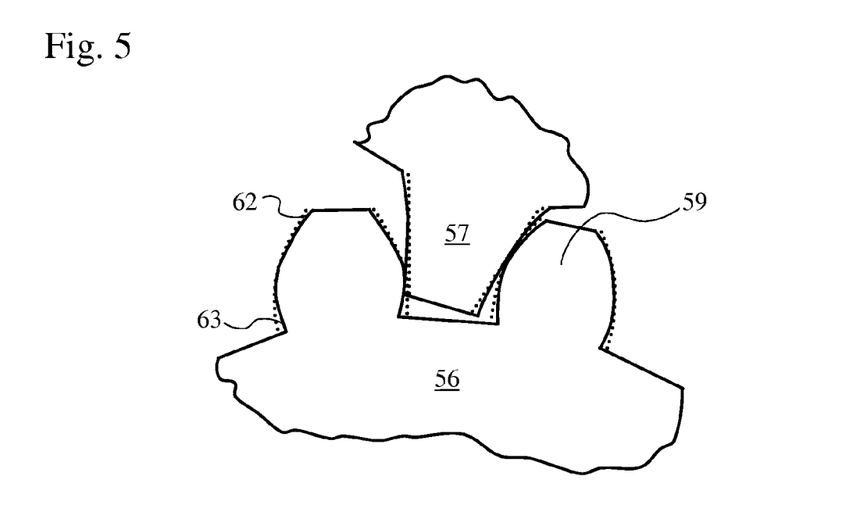
FIG. 5 is a schematic view of greatly enlarged portions of the worm-wheel teeth and the modified hob tool shown in FIG. 4.

The invention modifies this traditional process by altering the shape of the hob cutter. This is illustrated schematically in FIG. 5 which shows an enlarged cutting tool 57 of hob 54 and two enlarged hybrid teeth 58 and 59 of worm-wheel portion 56 of balance gear 55. Hob cutting tool 57 is not straight sided (as shown in dotted lines) but rather has a slightly concave shape as shown in solid lines. This concave-shaped cutter alters the involute shape of teeth 58, 59 (as shown exaggeratedly in dotted lines) to increase the depth of the cut at both the tip 62 and the root 63 of each tooth as shown in solid lines.

Figure 6:
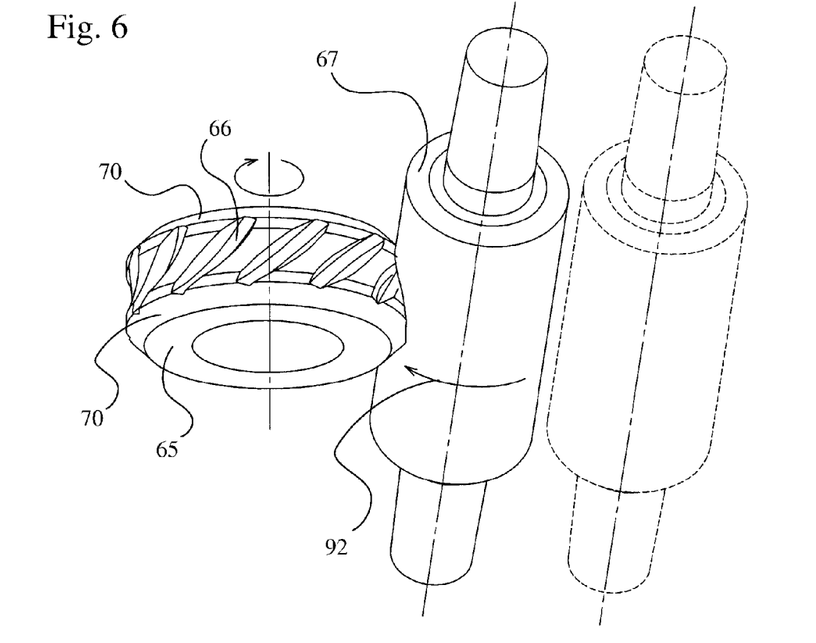
FIG. 6 is a partially schematic representation showing the teeth of a side-gear worm according to the invention being cut by a conventional hob tool in the manner conventionally used to cut worm-wheel teeth.

As indicated above, the design of the side-gear worm is also modified. The new side-gear worm is no longer cut like a conventional cross-axis helical. Instead, it is cut in the same manner as a conventional worm-wheel, namely, in the manner shown schematically in FIG. 6. The teeth 66 of side-gear worm 65 are cut by a conventional involute helicoid hob 67 that has conventional straight-sided cutting tools. However, instead of the traditional plunge and axial feed (e.g., as indicated in FIG. 4) that is normally used for cutting cylindrical helical teeth, hob 67 is only plunge fed (PF) 92 to depth as both side-gear worm 65 and hob 67 rotate. As noted above, teeth 66 are provided with a radical helix angle (i.e., greater than 45°) and the side gear blank is provided with a significant chamfer prior to the hobbing process so that the side-gear teeth are not cut with "closed" ends. A chamfer, as defined herein, is a flat surface made by cutting off the edge of the side-gear worm. A significant chamfer, as used herein, is a chamfer having a width of at least 5% of the radius of the side-gear worm to differentiate from a conventional chamfer merely used in manufacture to flatten excessively sharp edges. Preferably, the significant chamfer has a width of at least 10% of the radius of the side-gear worm.

Although, preferably, the side-gear teeth have an involute profile created with only plunge feed and the worm-wheel teeth are preferably helicoid worms having tip and root modifications made by the concave-shaped, as just explained above, in an alternative embodiment: the worm-wheel teeth have an involute profile created with only plunge feed while the side gear teeth are helicoid worms having tip and root modifications made by a similarly shaped concave-shaped.

Figure 7:
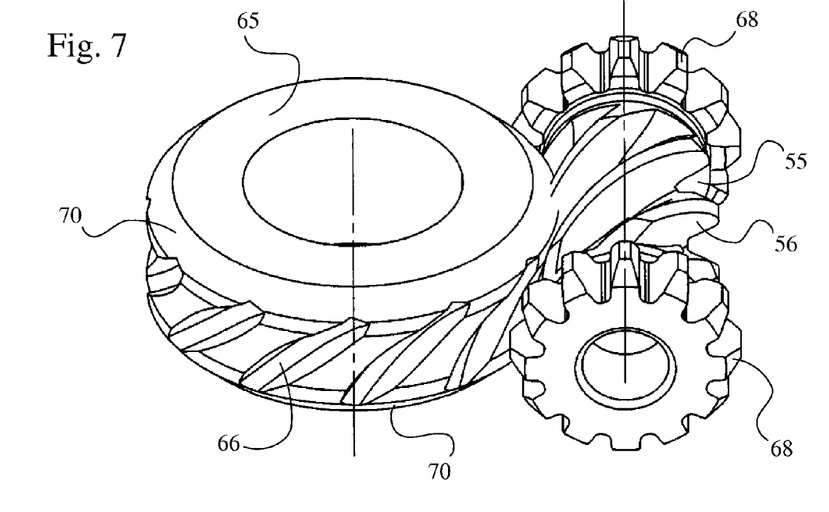
FIG. 7 is a perspective view of a balance gear and side gear according to the invention, the side gear blank having been significantly chamfered prior to the hobbing process indicated in FIG. 6.

The just-described modifications create the preferred form for side-gear worm 65 and balance gear 55 shown in FIG. 7. As can be seen best in this final view, the chamfering of side-gear worm 65 provides the teeth of side-gear worm 65 with a significant chamfer 70 that improves operation by preventing pinching between the teeth of the gear pair. This improved pair of gears functions with characteristics more closely approximating a true worm/worm-wheel pair, including a sliding component in their meshing action that is significantly higher in comparison to conventional helical sets. This increased sliding component results in a higher frictional component in the mesh. As indicated above, such an increased frictional component increases the mechanical disadvantage that results when the balance gear worm-wheel tries to back-drive the side-gear worm, thereby increasing the effectiveness of the invention's crossed axis differential in transferring torque to the wheel having greater traction.

Also, the inventive gears mesh with a broader "box-like" contact pattern over a broader side-gear tooth face, and tip and root interferences are avoided so that each pair can function effectively as a worm/worm-wheel combination with their unusually low 1.5:1-2.5:1 gear ratio. All of these advantages are achieved with the new worm/worm-wheel set without any loss in efficiency.

Timing of Gearing

This efficient new design brings another important advantage. The gear design assures that more than one tooth is in mesh in each gear set at all times, and all gear sets are always in mesh. In the preferred design illustrated in FIG. 7, the spur gear sets 68 of each balance gear each have twelve (12) teeth, while the worm-wheel portion 56 has only six (6) teeth that mesh with twelve (12) teeth 66 of the side-gear worm 65.

Since these tooth numbers are all divisible by either 2 or 3, all teeth equally share the load at all times. Also, it is impossible to assemble the gears with incorrect timing. That is, any improperly positioned balance gear will not align properly with its respective mounting hole 38, 38' in its respective housing 20, 20'. Further, by merely rotating such a misaligned balance gear by one tooth in either direction, correct alignment and gear timing is achieved.

Also, with the preferred 12-6-12 design of FIG. 7, any balance gear may be used in any mesh in any two-gear set in a differential such as the design shown in FIG. 2, or the same balance gear can be used in any mesh in a three-gear set performance vehicle differential such as the design shown in FIG. 3. This important feature assures a significant reduction in the time and cost of assembly as well as in the stocking of part inventories.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. In a full-traction differential that transfers rotational forces from an external power source to a pair of side-gear worms in a gear complex supported in a housing rotationally driven by the external power source, each side-gear worm comprising a plurality of side-gear teeth, the gear complex comprising the side-gear worms rotating about a first axis, each side-gear worm being fixed to a respective one of two output axles received in the housing, at least two sets of paired balance gears, each balance gear of each set being mounted for rotation about an axis substantially perpendicular to the first axis, each balance gear having a pair of spur-gear portions comprising a plurality of spur-gear teeth, spaced apart from a worm-wheel portion comprising a plurality of worm-wheel teeth, each balance gear being in mating engagement with the other balance gear of the pair through the spur-gear portions and in mating engagement with a respective one of the side-gear worms through the worm-wheel portion, wherein the improvement comprises:

for each pair of side gear teeth and worm-wheel teeth in mating engagement, either the side-gear teeth or the worm-wheel teeth have an involute profile cut with only plunge feed and the other of either the side-gear teeth or worm-wheel teeth are helicoid worms having a plurality of tip and root modifications made by a concave-shaped cutter;

wherein the side-gear worms have a helix angle equal to or greater than 45°; and wherein the side-gear worms and the worm-wheel portions provide a gear ratio between 1.5:1 and 2.5:1.

2. The full-traction differential of claim 1, wherein the side-gear teeth have the involute profile with only plunge feed and the worm-wheel teeth are helicoid worms having tip and root modifications.

3. The full-traction differential of claim 2, wherein the side-gear worms and the worm-wheel portions of the balance gears share a sliding component in mating engagement that decreases the efficiency of transferring torque directed from the external power source to the respective output axles and increases the efficiency of transferring torque directed from the output axles toward the external power source.

4. The full-traction differential of claim 2, wherein each end of each involute tooth of the side-gear worms is significantly chamfered.

5. The full-traction differential of claim 1, wherein the worm-wheel teeth have the involute profile with only plunge feed and the side-gear teeth are helicoid worms having tip and root modifications.

6. The full-traction differential of claim 1, wherein the numbers of the spur-gear teeth, the worm-wheel teeth, and the side-gear teeth are all divisible by 2.

7. The full-traction differential of claim 1, wherein the numbers of the spur-gear teeth, the worm-wheel teeth, and the side-gear teeth are all divisible by 3.

8. The full-traction differential of claim 7, wherein the numbers of the spur-gear teeth, the worm-wheel teeth, and the side-gear teeth are all divisible by 2.

9. The full-traction differential of claim 1, wherein the number of the spur-gear teeth of each balance gear is twice the number of the worm-wheel teeth of the same balance gear.

10. The full-traction differential of claim 9, wherein each spur-gear portion has twelve spur-gear teeth, each worm-wheel portion has six worm-wheel teeth, and each side-gear worm has twelve side-gear teeth.

* * * * *